(12) United States Patent
Polyakov et al.

(10) Patent No.: US 6,559,402 B2
(45) Date of Patent: May 6, 2003

(54) PROCESS FOR SEPARATION OF LOW NATURAL CONCENTRATION ISOTOPES IN AN ELECTROMAGNETIC SEPARATOR WITH ION SOURCE

(75) Inventors: Leonid Alexeevich Polyakov, Lesnoi (RU); Alexei Nikolaevich Tatarinov, Lesnoi (RU); Jury Alexandrovich Monastyrev, Lesnoi (RU); Luiza Yakovlevna Konoplina, Lesnoi (RU)

(73) Assignee: Gosudarstvennoe Uhitarnoe Predpriyatie, Lesnoi (RU)

( * ) Notice: Subject to any disclaimer, the term of this patent is extended or adjusted under 35 U.S.C. 154(b) by 0 days.

(21) Appl. No.: 09/870,503

(22) Filed: Jun. 1, 2001

(65) Prior Publication Data

US 2002/0003094 A1 Jan. 10, 2002

(30) Foreign Application Priority Data

Jun. 2, 2000  (RU) ............................................ 00114511

(51) Int. Cl.[7] ............................. B01D 5/00; H01J 49/00
(52) U.S. Cl. ............................. 204/157.2; 204/157.22; 250/283
(58) Field of Search ....................... 204/157.2, 157.22; 250/283

(56) References Cited

U.S. PATENT DOCUMENTS

| 4,124,801 A | * | 11/1978 | Cook et al. | 250/288 |
| 4,394,579 A | * | 7/1983 | Schwrizke | 250/423 |
| 5,162,699 A | * | 11/1992 | Tokoro et al. | 315/111.81 |
| 5,443,702 A | * | 8/1995 | Haynam et al. | 204/157.22 |
| 5,865,984 A | * | 2/1999 | Corbin, Jr. et al. | 205/670 |
| 6,259,763 B1 | * | 7/2001 | Bitter et al. | 378/82 |

OTHER PUBLICATIONS

Eng. Abstract—N.I. Datsko et al., *Nevinnomyssky Republican Electromechanical Factory*, Russian Application No. 4367725/63, Filed Jan. 20, 1988, Russian Publication No. 1717197, *Method for Enrichment of Isotopes*.
Mockba, 1989 pp. 68, and 86–110; with English Translation, N.A. Kascheev et al., *Moscow Energoatomizdat* 1989, *Electromagnetic Separation of Isotopes and Isotopic Analysis*, pp. 11–18 Month Unavailable.

* cited by examiner

Primary Examiner—Edna Wong
(74) Attorney, Agent, or Firm—Pennie & Edmonds LLP

(57) ABSTRACT

A process of separating low natural concentration protons in an electromagnetic separator having an ion source utilizes X-ray spectral analysis to distinguish areas of separated, increased-content of isotope enriched substance so as to treat them separately from areas of separated, low-content of isotope enriched substance. The overall process includes placing a working substance of a separated element in a crucible of the ion source, heating the working substance up to vapor forming, ionizing the vapors in a gas-discharge chamber of the source under action of hot cathode electron emission, shaping an ionic beam by electrodes of ion-optical system, separating and shaping the ionic beams of isotopes in a magnetic field, catching the ions in boxes of a receiver, identifying areas in the receiver boxes of increased content of isotope enriched substance using X-ray spectral analysis, withdrawing enriched substance initially from these identified areas, and further processing.

7 Claims, 2 Drawing Sheets

PROCESS FOR SEPARATION OF LOW NATURAL CONCENTRATION ISOTOPES IN AN ELECTROMAGNETIC SEPARATOR WITH ION SOURCE

FIELD OF THE INVENTION

The invention is related to the technology of electromagnetic separation of chemical elements, in particular, to electromagnetic separation of low natural concentration isotopes. The invention can be most efficiently used for industrial electromagnetic separating stable isotopes of low natural concentration.

BACKGROUND OF THE INVENTION

A process is known for separating isotopes of chemical elements applied for industrial electromagnetic separation of isotopes (N. A. Kascheev, V. A. Dergatchev "Electromagnetic separating isotopes and isotopic analysis". M. "Energoatomizdat", 1989, pp. 68, 86–109). The process for separating isotopes of chemical elements described in this known art reference comprises the following. A working substance of the element is loaded in a crucible of the source, and is heated up to forming vapors of the working substance. The vapors of the working substance come to a gas-discharge chamber of the source, where they are ionized under action of electron emission from a hot cathode. The ions are withdrawn from the gas-discharge chamber, and shaped into an ion beam by electrodes of an ion-optical system. During the path through an evacuated separating chamber, the ion beams of isotopes of chemical elements are separated in a magnetostatic field depending on mass of isotopes, are focused by this field and are caught by the relevant boxes of the receiver. The isotopes are then extracted from the receiver boxes by electrochemical etching of the internal surface of the receiver.

A process for enrichment of isotopes is known comprising accumulation of isotopes in pockets of the receiver of the magnetic separator and extraction of the accumulated enriched substance, wherein the internal surfaces of the receiver pockets are cleaned from the beam material before extraction of the enriched substance, and extraction of the enriched substance, is performed by deep chemical etching of the pockets surface with subsequent extraction of the isotope from the etching products. (RU 1717197 of Jan. 20, 1988, by Datsko N.J. et al.). FIG. 2 depicts a device as disclosed in RU 1717197 that is used to separate ions in accordance with the prior art. As seen in this figure, the separation chamber 21 includes an ion source 22 of a magnetic separator which creates ion beams 23 that are received in pockets 24 of a receiver 25.

SUMMARY OF THE INVENTION

The present invention provides a process for obtaining a higher enrichment level of enrichment of low natural concentration isotopes.

The claimed process for separating stable low natural concentration isotopes in an electromagnetic separator with a ion source comprises arranging a working substance in an ion source crucible, heating the working substance up to vapor forming, ionizating the vapors in a gas-discharge chamber of the source under action of hot cathode electron emission, forming an ion beam by electrodes of ion-optical system, separating and focusing the ion beams of isotopes in a magnetic field and catching the ions in boxes of the receiver, exposing the boxes of the receiver to X-ray spectral analysis to identify those areas having heightened content of isotope enriched substance, removing the isotope enriched substance from these areas, and separately treating the remaining areas of the surface of the receiver's boxes.

DETAILED DESCRIPTION OF THE PREFERRED EMBODIMENT

Low natural concentration isotopes are the isotopes with low content in a natural chemical element. To illustrate the content of natural isotopes of calcium the applicants refer to the known table "Relative Abundance of the Natural Isotopes":

$Ca^{40}$—96.941 relative %;
$Ca^{42}$—0.647 relative %;
$Ca^{43}$—0.135 relative %;
$Ca^{44}$—2.086 relative %;
$Ca^{46}$—0.004 relative %;
$Ca^{48}$—0.187 relative %.

Thus isotopes $Ca^{42}$, $Ca^{43}$, $Ca^{46}$, $Ca^{48}$ are low natural concentration isotopes.

Figure 1:
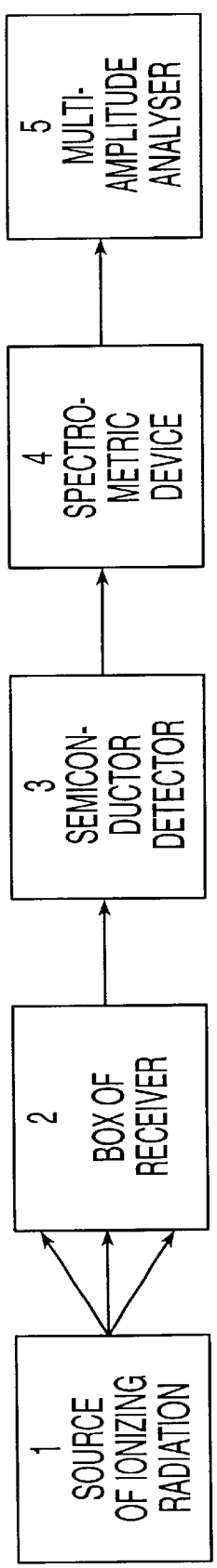
FIG. 1 shows an apparatus for definition of content of an isotope substance in a box of the receiver with a series connection of the following devices used by the technicians in this art.
Figure 2:
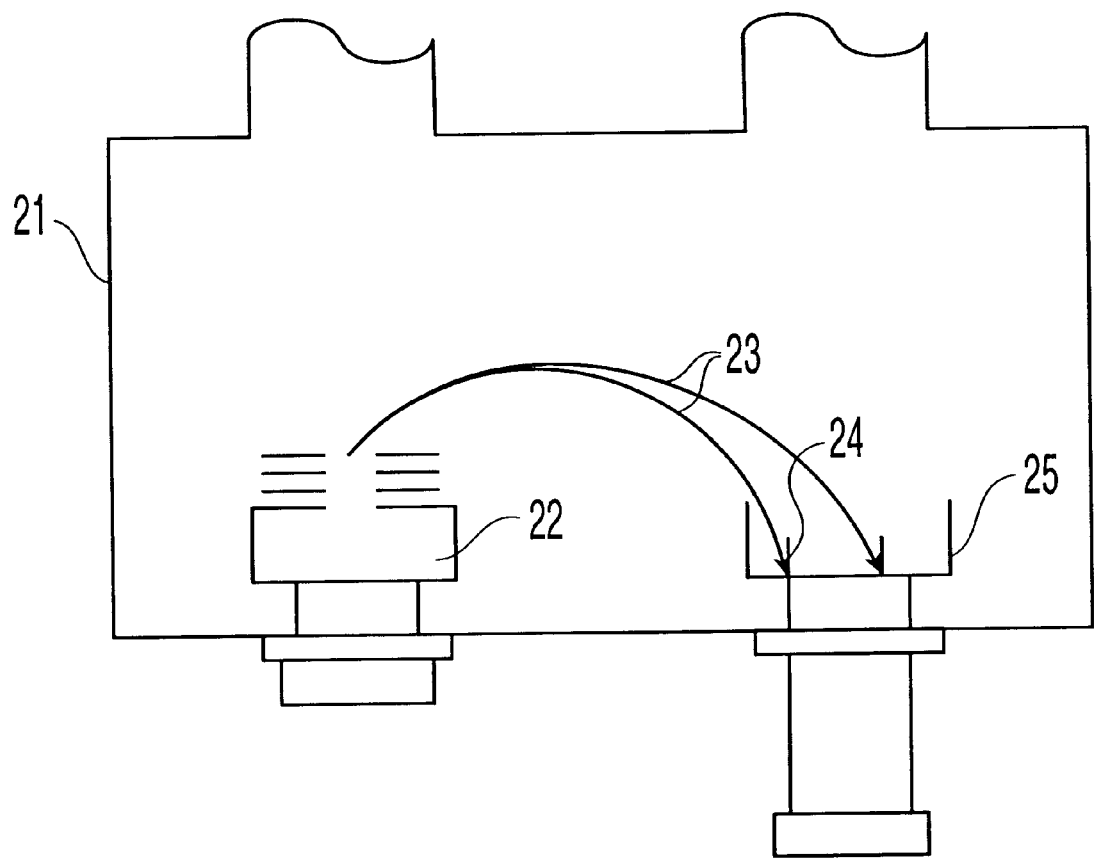
FIG. 2 shows a prior art separation device.

FIG. 1 shows a block diagram of an apparatus which can be employed in conjunction with the process of the present invention to separate low natural concentration isotopes. The process may utilize an ionizing radiation source 1, a receiver 2, a semiconductor detector 3, a spectrometric path 4 and a multi-amplitude analyzer 5. The receiver comprises a block of boxes, each configured to receive separated isotopes. During operation of the electromagnetic separator, ion beams of isotopes are separated in a static magnetic field according to the weight of each isotope, are focused by this field and are thereby caused to settle on internal surfaces of the receiver's boxes.

An internal surface of box 2 of the receiver is exposed to irradiation in the apparatus containing an ionizing radiation source 1, and atoms of a working substance, or sample, on the surface of the receiver are excited and receive energy. This radiation through semiconductor detector 3 is transmitted to spectrometric path 4 which leads to multi-amplitude analyzer 5. The multi-amplitude analyzer transforms the received signals and displays on its screen the level of radiation energy of the element. A characteristic X-ray spectrum peak of the detected element establishes the presence of the isotope-enriched substance in the receiver. The intensity of radiation correlates to the amount of substance in the analyzed area. Areas on the receiver having increased isotope substance content are identified and designated, such as by marking with a pen or other instrument, on the box of the receiver. This area is then treated separately from areas having decreased isotope substance content. Areas of the receiver are treated by electro-chemical etching. Two different solutions are obtained as a result of separate treatment of the receiver box, each solution containing a separated product having a different level of enrichment. The obtained solutions are analyzed for isotope composition and processed to the end product.

Experiments on separation of dysprosium isotope were also carried out in the above-described manner, with dysprosium chloride being used as a sample substance.

The invention will be further explained by the way of example of the process for separating low natural concentration isotopes in the electromagnetic separator. Separating chambers of the electromagnetic separator "SU-20" of the industrial complex "Elekrohimpribor", Russia, known to those skilled in the art, were used for the experiments. This apparatus is described in Dergatchiov's article, pp. 6, 8, 14, referenced in the section "Background of invention".

A predetermined, weighed amount of a sample of metal calcium is put in a horizontally disposed crucible of the ion source, with the sample including the isotopes to be separated. The separator has two heaters: one for heating of the gas-discharge chamber and another for heating of the crucible. After installation of the source and receiver in the separating chamber of the separator, the chamber is pumped-out by vacuum pumps up to the pressure of between $1 \times 10^{-3}$ Pa to $2 \times 10^{-3}$ Pa. In addition, a high voltage of about 32–33 kV is applied to the electrodes of the source to thereby clean and polish the electrodes in preparation for the separation step (a "pre-aging" or "training" step).

In order to obtain an electronic beam in the gas-discharge chamber of the source, a voltage is fed to the cathode unit, thus ionizing the vapors of the working substance. The vapors formed with help of the ion-optical system are drawn out through a slot of the gas-discharge chamber and shaped into an ion beam which, under action of accelerating voltage and magnetostatic field, is separated into ion beams of isotopes according to masses of the ions. These ion beams are focused by the magnetic field onto a focal plane in which are arranged the inputs, or openings, of the receiver's boxes. The receivers are taken out from the separating chamber after accumulation and placed in the assembly described hereinabove by the flowchart shown in FIG. 1.

During experimental and pilot separation on the industrial electromagnetic separator "SU-20" of the industrial complex "Elekrohimpribor", Russia, the following isotopes were totally obtained (processed up to the end product):

isotope $Ca^{42}$ with enrichment of 92.6%—0.909 g.;

isotope $Ca^{43}$ with enrichment of 74.7%—1.166 g.;

isotope $Ca^{48}$ with enrichment of 91.8%—1.583 g.;

isotope $Dy^{156}$ with enrichment of 19.8%—0.754 g.;

isotope $Dy^{158}$ with enrichment of 23.7%—0.650 g.

Aforementioned SU 1717197 teaches a general processing of the receiver internal surface first by a mechanical, and then by a chemical method without first determining the zones of increased and lowered density of the isotope-enriched substance. In contrast, in the present invention, the zones of increased and lowered density of the isotope-enriched substance are first determined on the internal surface of the receiver, i.e., the zones containing highly enriched and low enriched product are identified, and then these zones are processed separately.

Table 1 shows the comparison results for the known prior art separation approach, and the approach of the present invention. As seen in Table 1, the results demonstrate the technical and economical advantages of the present claimed process for separating low natural concentration isotope in the electromagnetic separator with area withdrawal over the prior art method. In summary, the process of the present invention results in an end product having the greatest enrichment level.

TABLE 1

Comparison of Separation Performance Between Prior Art and Present Invention

| No. | Main parameters | Prior art | Claimed invention |
|---|---|---|---|
| 1 | Ion source with two heaters | With horizontal crucible | With horizontal crucible |
| 2 | Working substance: a) b) | Metal calcium Dysprosium chloride | Metal calcium Dysprosium chloride |
| 3 | Separating chamber pressure, Pa | $1-2 \times 10^{-3}$ | $1-2 \times 10^{-3}$ |
| 4 | Isotope enrichment, %: | | |
|  | $Ca^{42}$ | 87.,8 | 92.6 |
|  | $Ca^{43}$ | 69.7 | 74.7 |
|  | $Ca^{48}$ | 89.5 | 91.8 |
|  | $Dy^{156}$ | 15.6 | 19.8 |
|  | $Dy^{158}$ | 19.8 | 23.7 |

The present invention may find use in a number of industrial settings for electromagnetic separation of isotopes, particularly for obtaining low natural concentration isotopes with higher enrichment level without decreasing output.

Finally, while the invention has been described and illustrated herein with respect to preferred embodiments, it should be apparent that various alternatives, modifications, adaptions, and variations will be apparent to those skilled in the art and may be made utilizing the teachings of the present disclosure without departing from the scope of the invention and are intended to be within the scope of the invention as defined by the claims herein.

What is claimed is:

1. A process for separating low natural concentration isotopes in an electromagnetic separator having an ion source comprising:

placing a working substance containing isotopes into a crucible of the ion source;

heating the working substance up to the formation of vapors;

ionizing the vapors in a gas-discharge chamber of the source under action of hot cathode electron emission;

forming an ion beam of isotopes in said vapors;

separating and focusing the ion beams of isotopes in a magnetic field;

receiving the isotopes in boxes of a receiver;

identifying first areas of the receiver having an increased content of isotope enriched substance;

removing the isotope enriched substance from said first areas; and treating remaining areas of the surface of the receiver boxes and the areas with decreased content of the isotope substance.

2. The process according to claim 1, further comprising a step of exposing the boxes of the receiver to X-ray spectral analysis after receiving the isotopes to help identify said first areas.

3. A process according to claim 1, wherein the areas of the receiver having decreased isotope substance content are separately treated by electrochemical etching.

4. A process for separating low natural concentration isotopes comprising:

forming a beam of ions in a vapor phase of the low natural concentration isotopes to be separated;

receiving the isotopes in boxes of a receiver; and performing X-ray spectral analysis of the boxes of the receiver to thereby identify first areas of the receiver having an increased content of isotope enriched substance.

5. A process according to claim 4, further comprising removing isotopes in said first areas of the receiver having increased content of the isotope enriched substance.

6. A process according to claim 5, further comprising separately treating remaining areas of the receiver.

7. A process according to claim 6, further comprising separately treating areas of the receiver having decreased isotope enriched substance content.

* * * * *

UNITED STATES PATENT AND TRADEMARK OFFICE
CERTIFICATE OF CORRECTION

PATENT NO. : 6,559,402 B2
DATED : May 6, 2003
INVENTOR(S) : Leonid Alexeevich Polyakov et al.

It is certified that error appears in the above-identified patent and that said Letters Patent is hereby corrected as shown below:

<u>Title page,</u>
Item [73], Assignee, replace "Gosudarstvennoe Uhitarnoe Predpriyatie" with
-- Gosudarstvennoe Unitarnoe Predpriyatie Kombinat "ELEKTROKHIMPRIBOR" --.

Signed and Sealed this

Eleventh Day of November, 2003

JAMES E. ROGAN
*Director of the United States Patent and Trademark Office*